United States Patent
Goldhamer

(10) Patent No.: US 10,652,769 B2
(45) Date of Patent: May 12, 2020

(54) COUPLING LOSS IN WIRELESS NETWORKS

(71) Applicant: Mariana Goldhamer, Ramat Gan (IL)

(72) Inventor: Mariana Goldhamer, Ramat Gan (IL)

( * ) Notice: Subject to any disclaimer, the term of this patent is extended or adjusted under 35 U.S.C. 154(b) by 0 days.

(21) Appl. No.: 15/746,416

(22) PCT Filed: Jul. 20, 2016

(86) PCT No.: PCT/IB2016/054313
§ 371 (c)(1),
(2) Date: Jan. 21, 2018

(87) PCT Pub. No.: WO2017/017564
PCT Pub. Date: Feb. 2, 2017

(65) Prior Publication Data
US 2018/0220313 A1  Aug. 2, 2018

Related U.S. Application Data

(60) Provisional application No. 62/196,960, filed on Jul. 25, 2015.

(51) Int. Cl.
*H04W 24/08* (2009.01)
*H04W 24/10* (2009.01)
(Continued)

(52) U.S. Cl.
CPC .......... *H04W 24/08* (2013.01); *H04B 17/309* (2015.01); *H04L 5/005* (2013.01);
(Continued)

(58) Field of Classification Search
CPC ..... H04W 24/08; H04W 52/44; H04W 16/10; H04W 24/00; H04W 24/10;
(Continued)

(56) References Cited

U.S. PATENT DOCUMENTS

2013/0242889 A1  9/2013  Khoryaev
2014/0016576 A1*  1/2014  Noh ................... H04W 52/362
                                           370/329
(Continued)

FOREIGN PATENT DOCUMENTS

WO  WO213023290 A1  2/2013

OTHER PUBLICATIONS

3GPP TS 36.211 v12.6.0, (Jun. 2015) "Physical channels and modulation" (Release 12).

(Continued)

*Primary Examiner* — Gregory B Sefcheck
*Assistant Examiner* — Joshua Smith

(57) ABSTRACT

A method for wireless network operation includes, in a cluster of transmitters and receivers in a wireless network, configuring a transmitter of a first node and a transmitter of an interfering node to transmit only in their own dedicated time-frequency partition a signal at a non-zero transmission power, and to transmit a zero power signal in a second time-frequency partition. A receiver of a second node is configured to measure a first received power in a third time-frequency partition dedicated to an interfering transmitter and a second received power in the second time-frequency partition dedicated to receive interference from outside the cluster. A net signal power is determined by subtracting the second received power from the first received power. A coupling loss between the interfering transmitter and the receiver is computed based on the net signal power and the non-zero transmission power.

22 Claims, 6 Drawing Sheets

(51) Int. Cl.
*H04W 24/00* (2009.01)
*H04W 16/10* (2009.01)
*H04W 52/44* (2009.01)
*H04L 5/00* (2006.01)
*H04B 17/309* (2015.01)
*H04W 72/04* (2009.01)

(52) U.S. Cl.
CPC ............ *H04L 5/0053* (2013.01); *H04W 16/10* (2013.01); *H04W 24/00* (2013.01); *H04W 24/10* (2013.01); *H04W 52/44* (2013.01); H04L 5/0005 (2013.01); H04W 72/044 (2013.01)

(58) Field of Classification Search
CPC .... H04W 72/044; H04L 5/0053; H04L 5/005; H04L 5/0005; H04B 17/309
See application file for complete search history.

(56) References Cited

U.S. PATENT DOCUMENTS

| | | | |
|---|---|---|---|
| 2014/0036796 A1 | 2/2014 | Etemad | |
| 2014/0056243 A1* | 2/2014 | Pelletier | H04W 74/04 370/329 |
| 2014/0119266 A1 | 5/2014 | Ng | |
| 2014/0177467 A1* | 6/2014 | Kim | H04W 52/242 370/252 |
| 2014/0185530 A1 | 7/2014 | Kuchibhotla | |
| 2014/0221038 A1* | 8/2014 | Nakashima | H04L 5/0051 455/522 |
| 2015/0063099 A1 | 3/2015 | Sadek | |
| 2015/0092627 A1 | 4/2015 | Liu | |
| 2015/0223149 A1* | 8/2015 | Liu | H04W 48/12 370/252 |
| 2015/0223181 A1* | 8/2015 | Noh | H04L 5/0048 370/329 |

OTHER PUBLICATIONS

3GPP TS 36.213 v12.6.0, (Jun. 2015) "Physical layer procedures" (Release 12).
3GPP TS 36.300v12.6.0, (Jun. 2015) "Overall description;Stage 2" (Release 12).
3GPP TS 36.331v12.6.0, (Jun. 2015) "Radio Resource Control (RRC); Protocol specification" (Release 12).
3GPP TS 36.423 v12.5.0, (Mar. 2015) "X2 application protocol (X2AP)" (Release 12).
3GPP TR 36.824 V11.0.0 (Jun. 2012), "LTE coverage enhancements" (Release 11).

* cited by examiner

COUPLING LOSS IN WIRELESS NETWORKS

FIELD OF THE INVENTION

This disclosure relates generally to digital communication systems and in particular to cellular systems.

BACKGROUND OF THE INVENTION

LTE Release 13 standardized concept supports the transmission of CSI (Channel State Information) measurements, based on so-called CSI Processes (see 3GPP TS 36.213 v 12.6.0), each CSI process including a NZP (Non-Zero Power) CSI-RS (CSI Reference Signal) transmission and one or more CSI-RS ZP (Zero Power) transmissions. Based on these CSI-RS signals transmitted by the eNB (base station in LTE), an UE (User Equipment) can assess the CQI (Channel Quality Indicator) including the recommended modulation and coding scheme; RI (rank indicator) or PMI (pre-coding matrix indicator) can be also included in the CSI Report.

Given the fact that, in deployments with multiple base stations, a CQI Report is needed for each combination of the transmitting base stations, the CQI approach conducts to numerous resources allocated for CSI-RS ZP. As shown in the 3GPP RAN3 contribution R3-150723, in case of coordinated CSI measurements for determining CQI in only 5 cells, the overhead of CSI-RS ZP would result in a capacity loss of 33%.

Some research papers present the notion of a network graph, presenting the path losses of the wireless connections between different nodes as a characterization of the wireless network interactions.

However, as shown above, in case of multiple interfering sources, CQI is not a suitable parameter to be used in a network graph.

SUMMARY

An embodiment of the present invention that is described herein provides a method for wireless network operation. The method includes, in a cluster of at least two nodes having respective transmitters and receivers in a wireless network, configuring a transmitter of a first node to transmit in a first time-frequency partition a first signal at a non-zero transmission power, and to transmit a second signal at a zero transmission power in at least one second time-frequency partition. The transmitters of all nodes in the cluster, other than the first node, are configured to refrain from transmission during the first and second time-frequency partitions. A receiver of a second node in the cluster is configured to measure a first received power in the first time-frequency partition and a second received power in the second time-frequency partition. A net signal power is calculated from the first received power and the second received power. A coupling loss between the transmitter of the first node and the receiver of the second node is computed based on the net signal power and of the non-zero transmission power.

In some embodiments, each of the first and second node is a base station or a User Equipment (UE). In an embodiment, each of the first and second time-frequency partitions includes a resource element, multiple resource elements, a physical resource block, a group of physical resource blocks, or a radio channel within at least one subframe. In a disclosed embodiment, the first and second signals include reference signals. In another embodiment, the first and second signals include signals representing data.

In a disclosed embodiment, the method further includes averaging the first received power or the second received power or the net signal power over at least one element in a list consisting of: a system bandwidth of the wireless network, a component carrier, one or more of physical resource blocks, and one or more subframes. In an embodiment, computing the coupling loss includes representing the coupling loss in logarithmic form or in linear form. In another embodiment, computing the coupling loss includes calculating the coupling loss at the receiver of the second node. Alternatively, computing the coupling loss may include calculating the coupling loss by a node in the cluster or by a Central Coordinator.

In yet another embodiment, transmitting the first and second signals includes transmitting configurations of reference signals over an air interface from a base station to a user equipment, or from a user equipment to another user equipment. In still another embodiment, transmitting the first and second signals includes establishing the configurations of reference signals in each node by a central coordinator and transmitting these configurations through a message to each node.

In some embodiments, the method further includes reporting the net signal power or the coupling loss over an information channel to a base station, to a user equipment, to a Central Coordinator, or to an Operation and Management entity. In an embodiment, the method further includes calculating by a Central Coordinator or by a node, based on the coupling loss, an expected desired or interference power of a data signal transmitted with a power value different from the non-zero power value. In an embodiment, the method further includes computing, by a Central Coordinator or by a node, expected Signal to Noise-and-Interference Ratios (SNIRs) for one or more desired data and interference data transmission powers. In an embodiment, the method further includes selecting a node, by the Central Coordinator, considering the expected SINRs. In a disclosed embodiment, the transmitter of the first node and the receiver of the second node use mutually-adjacent frequency channels.

There is additionally provided, in accordance with an embodiment of the present invention, a first node in a cluster of at least two nodes having respective transmitters and receivers in a wireless network. The first node includes one or more antennas and a transmitter. The transmitter is configured by a processor to transmit in a first time-frequency partition a first signal at a non-zero transmission power, and to transmit a second signal at a zero transmission power in at least one second time-frequency partition, while the transmitters of other nodes in the cluster are configured to refrain from transmission during the first and second time-frequency partitions, so as to enable a receiver of a second node to measure a first received power in the first time-frequency partition and a second received power in the second time-frequency partition, for calculating a net signal power from the first received power and the second received power and computing a coupling loss between the transmitter of the first node and the receiver of the second node based on the net signal power and of the non-zero transmission power or transmitting the value of the net signal power for calculating a coupling loss to a node or to a central coordinator.

There is also provided, in accordance with an embodiment of the present invention, a second node in a cluster of at least two nodes having respective receivers and transmitters in a wireless network. The second node includes one or more antennas and a receiver. The receiver is configured by a processor to receive in a first time-frequency partition a first signal transmitted by a transmitter of a first node at a non-zero transmission power, and to receive a second signal transmitted by the transmitter of the first node at a zero transmission power in at least one second time-frequency partition, while the transmitters of other nodes in the cluster are configured to refrain from transmission during the first and second time-frequency partitions, for calculating a net signal power from the first received power and the second received power and computing a coupling loss between the transmitter of the first node and the receiver of the second node based on the net signal power and of the non-zero transmission power.

There is further provided, in accordance with an embodiment of the present invention, an apparatus for controlling or coordinating or managing a wireless network. The apparatus includes a communication interface for communicating with a cluster of at least two nodes having respective transmitters and receivers in the wireless network, and a processor. The processor is configured to configure a transmitter of a first node to transmit in a first time-frequency partition a first signal at a non-zero transmission power, and to transmit a second signal at a zero transmission power in at least one second time-frequency partition, to configure the transmitters of all nodes in the cluster, other than the first node, to refrain from transmission during the first and second time-frequency partitions, to configure a receiver of a second node in the cluster to measure a first received power in the first time-frequency partition and a second received power in the second time-frequency partition, to calculate or receive a calculation of a net signal power based on the first received power and the second received power, and to compute or receive a computation of a coupling loss between the transmitter of the first node and the receiver of the second node based on the net signal power and of the non-zero transmission power.

There is additionally provided, in accordance with an embodiment of the present invention, a wireless communication system including at least two nodes and one or more processors. The at least two nodes have respective transmitters and receivers, and include at least first and second nodes associated with a cluster of nodes. The one or more processors are configured to configure a transmitter of the first node to transmit in a first time-frequency partition a first signal at a non-zero transmission power, and to transmit a second signal at a zero transmission power in at least one second time-frequency partition, to configure the transmitters of all nodes in the cluster, other than the first node, to refrain from transmission during the first and second time-frequency partitions, to configure a receiver of the second node to measure a first received power in the first time-frequency partition and a second received power in the second time-frequency partition, to calculate a net signal power from the first received power and the second received power, and to compute or receive a computation of a coupling loss between the transmitter of the first node and the receiver of the second node based on the net signal power and of the non-zero transmission power.

BRIEF DESCRIPTION OF THE DRAWINGS

The drawings do not represent an exhaustive representation of the possible embodiments of the invention and the invention is not limited to the arrangements presented in the drawings.

The drawings are.

DETAILED DESCRIPTION

Embodiments of the invention are described hereinafter in conjunction with the figures.

The following description uses terminology familiar to those skilled in wireless cellular networks and in particular in LTE technology. This terminology should not be considered as a limitation for the applicability of the invention to other wireless technologies including evolving cellular technologies.

eNB or base station denotes all types of base stations, including macro, micro, pico, femto or home base station, small cell eNB, relays, remote radio heads, in distributed or centralized architecture, including C-RAN architecture.

In this document a Transmission Point (TP) may denote a base station or an UE (User Equipment) and may be named also "node".

A TP can operate in multiple frequency bands and channels; the used frequency band/channel is identified by a physical Cell-ID.

A Central Coordinator may be a software module placed on a base station, on a server located at the network edge (routers, etc.), on Internet, in the core network, in the Operation and Maintenance system, or in any other suitable location.

While the concept of "CSI process" in LTE Release 13 refers only to the band/channel used by the UE serving cell, in this disclosure we address a network graph considering both co-channel and adjacent channel interference.

The adjacent channel interference may be significant in dense deployments using channels which are adjacent in frequency to the channel used by the serving cell.

Figure 1:
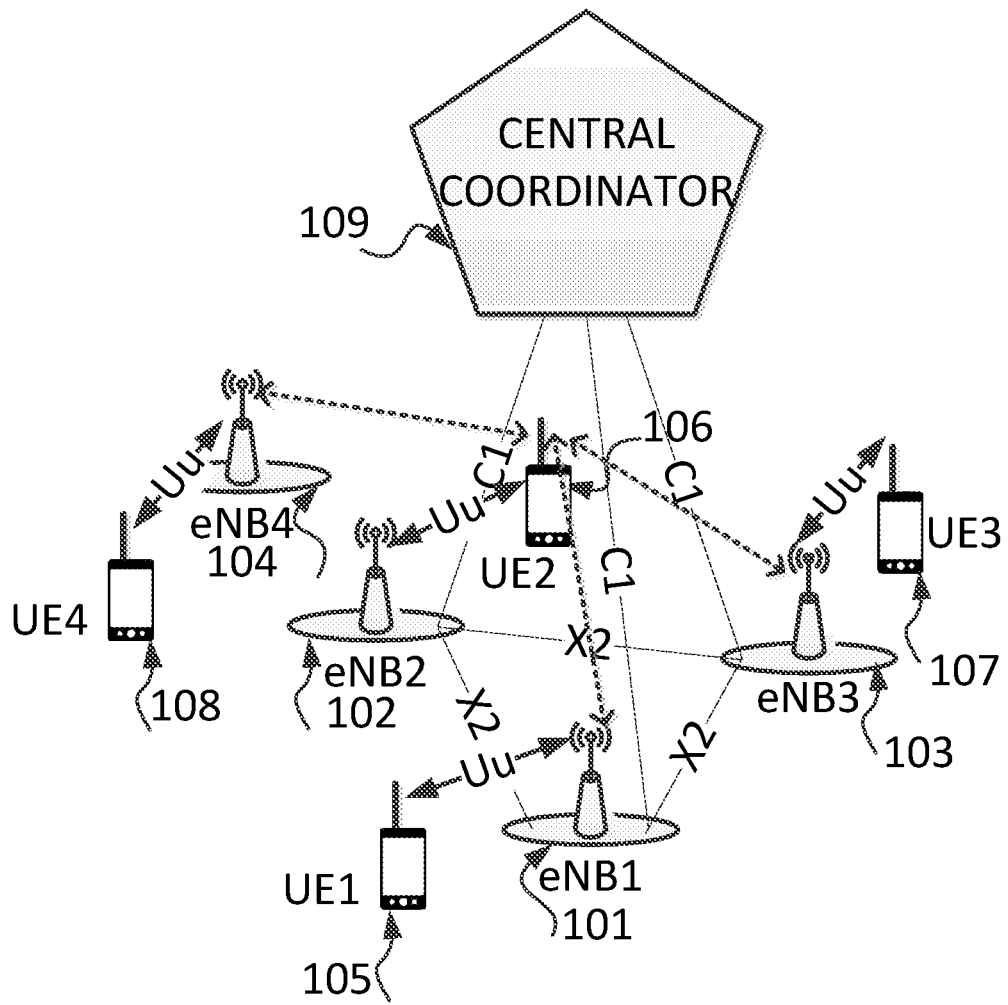
FIG. 1—Represents the system architecture, in accordance with an embodiment of the present invention.

The system architecture in some embodiments is described in FIG. 1, which includes the base stations eNB1—101, eNB2—102, eNB3—103, eNB4—104 and the UE1—105, UE2—106, UE3—107 and UE4—108, connected over the air to the serving eNB through Uu interface. In downlink, eNB1, eNB3, eNB4 create interference to the downlink transmissions of eNB2, received by UE2.

In a similar mode other UEs are interfered in downlink.

In uplink, the interference is created by transmissions of UEs and is perceived at the serving eNB of a specific UE.

The wireless access network can coordinate itself in a distributed mode, through the existing X2 interface, basically described in 3GPP TS 36.423. In the centralized mode, we consider a new C1 interface between each base station and the Central Coordinator—109, which can be in the future also part of the X2 interface or be a stand-alone interface.

Downlink Network Graph in the Channels of the Serving Cell

We target in this disclosure a method for creating the network graph which is scalable and can easily accommodate a variable number of active interferers, as scheduled by the Central Coordinator.

A network graph may use the path loss or the coupling loss as weight of each branch.

For deducing the coupling loss we consider the simplest form of a link budget, in dB:

$$P_R = P_T + G_T - PL - OL + G_R,$$

where:

$P_R$, $P_T$ are respectively the receive and transmit powers $G_T$, $G_R$ are respectively the transmit and receive antenna gains PL, OL are respectively path loss and other losses (connectors, cables, body absorption, fading, etc.).

We define the coupling loss (CL) in the linear form as:

$$CL = P_T/P_R, \text{ where:}$$

$P_T$—transmitted power at the transmitter antenna connector in Watts (W).

$P_R$—received power at the receiver antenna connector in W.

In logarithmic form, expressed in dB, $$CL \text{ (dB)} = P_T \text{ (dBm)} - P_R \text{ (dBm)}$$

Relative to the path loss (PL), CL is given by:

$$CL = PL - G_T - G_R + OL$$

CL can be considered as an abstraction of the wireless link, as it includes many values of parameters which are not needed to be known. Instead, it is sufficient to measure the received power at the antenna connector and know the transmitted signal power before the antenna connector for calculating it.

CL is very easy to use, as the received power, for example the received interference power $P_{RI}$, can be up-front calculated logarithmically as:

$$P_{RI} \text{ (dBm)} = P_{TI} \text{ (dBm)} - CL \text{ (in dB)}$$

However a Central Coordinator should add the interference from different sources to get the total interference at a receiver and for this it should use the linear form:

$$P_{RI} = P_{TI}/CL$$

where $P_{TI}$ is the power of the interfering transmitter and all powers are in W.

Figure 2:
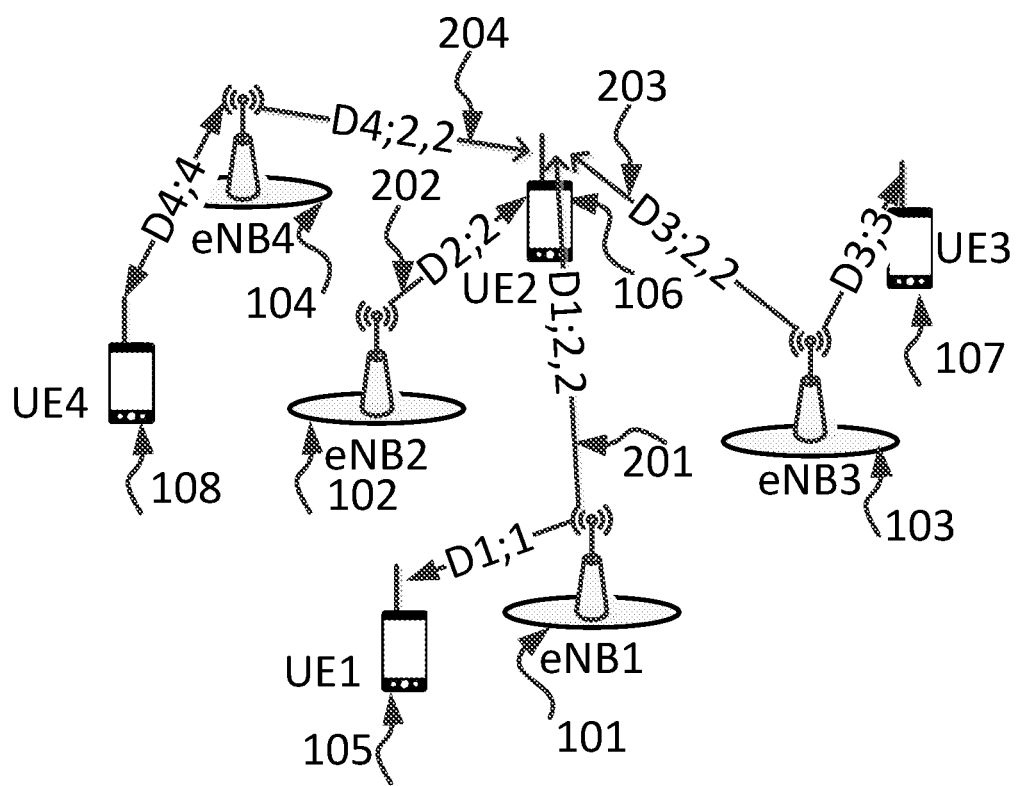
FIG. 2—Represents a downlink network graph, in accordance with an embodiment of the present invention.

An example of downlink network graph is shown in FIG. 2.

The network graph shows the base stations (nodes or vertices) creating interference for example to UE2—106. The lines between two vertices, for example the serving and the interfering link, are named "edges" of the network graph. The edges are noted with D (for downlink) followed by the index of the transmitting node, the index of the receiving UE and the index of the node serving the UE. In case of the edge link connecting an UE to a serving eNB, D is followed by the index of the node serving the UE and the index of the UE (receiver). In FIG. 2 the serving edge of UE2 is 202 (connecting UE2 with eNB2) and the interfering edges are 201, 203 and 204, connecting UE2 with respectively eNB1, eNB3 and eNB4.

Figure 3:
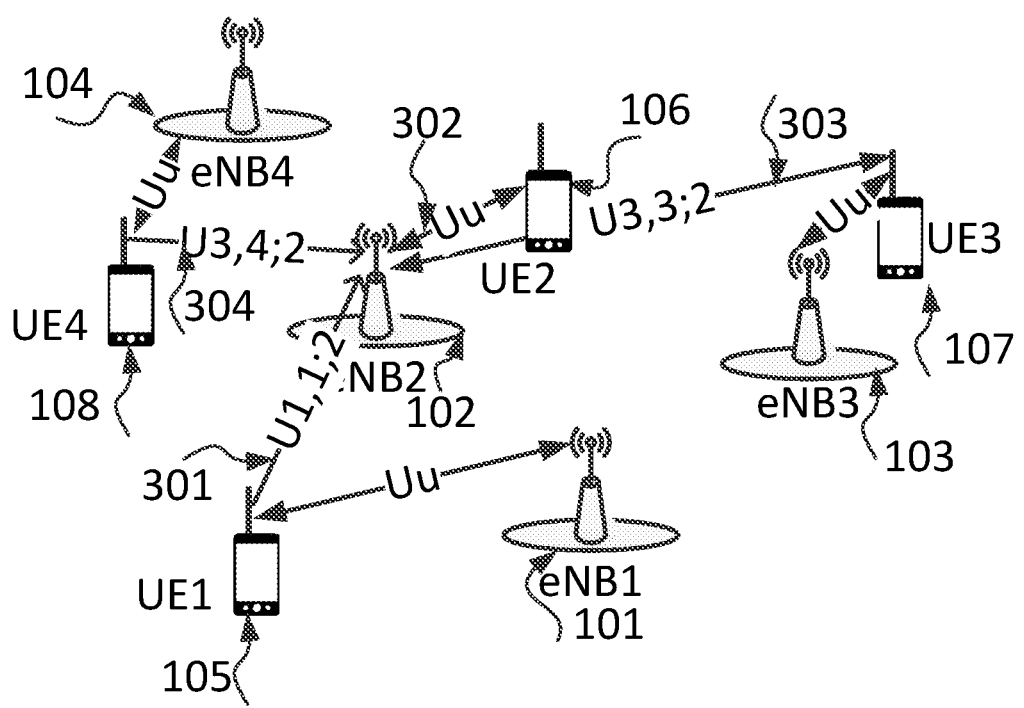
FIG. 3—Represents an uplink network graph, in accordance with an embodiment of the present invention.

FIG. 3 shows an example of an up-link network graph, in accordance with an embodiment. In this case the interference is created to the reception of the signal transmitted from UE2—106 by the surrounding UEs. The edges are noted with U (for uplink) followed by the index of the UE, the index of the node serving the UE and the index of the interfered node, if the node is not the same as the serving node. For example, the edge 302 indicates the serving edge (through LTE Uu air protocol) which connects eNB2 with UE2, while the edges 301, 303, 304 indicate the edges from the interfering UE1, UE3, UE4 to the victim base station eNB2.

Use of CQI for Path Loss Derivation

When an UE is reporting the recommended CQI such that a transport block will be received with an error probability of $10^{-1}$, it should consider the following:

Mapping between Signal to Interference-and-Noise Ratio (SINR) and the MCS (modulation and coding scheme, while considering also the demodulation loss);

Fade margin of the actual radio channel and the target BER;

Other factors.

Based on this, it results that the relation between CQI, as reported by UE, and path loss or coupling loss is not linear, while the exact value of parameters and the implementation of the UE for deriving the reported CQI is not known, such that the CQI use for the characterization of a network edge link is not optimal.

Coordinated CSI-RS Transmission

When applying special coordinated arrangements in a certain collaborating cluster of transmission points (eNBs and/or UEs), the received signal could be used for extracting the edges of the network graph, as long as each transmitter can be isolated from the others.

Table 1 illustrates an example of a proposed CSI-RS NZP and ZP allocation in a cluster comprising four different eNBs, in accordance with an embodiment.

TABLE 1

|  | CSI-RS1 | CSI-RS2 | CSI-RS3 | CSI-RS4 | CSI-RS5 |
|---|---|---|---|---|---|
| eNB1 Configuration | NZP CSI-RS | ZP CSI-IM2 | ZP CSI-IM3 | ZP CSI-IM4 | ZP CSI-IM5 |
| eNB2 Configuration | ZP CSI-IM1 | NZP CSI-RS | ZP CSI-IM3 | ZP CSI-IM4 | ZP CSI-IM5 |
| eNB3 Configuration | ZP CSI-IM1 | ZP CSI-IM2 | NZP CSI-RS | ZP CSI-IM4 | ZP CSI-IM5 |
| eNB4 Configuration | ZP CSI-IM1 | ZP CSI-IM2 | ZP CSI-IM3 | NZP CSI-RS | ZP CSI-IM5 |

In Table 1, the serving eNB1 sends NZP CSI-RS only for one of the CSI-RS allocations, while the rest of CSI RS are used as CSI-IM, for measuring at UE the received signal created by the interfering nodes.

One CSI-IM resource configured in all eNBs (last column) is used for measuring the background interference (interference from outside the cluster and/or receiver noise), as no node transmits NZP CSI-RS.

It should be noted that in our arrangement for measuring the coupling loss between an UE and the surrounding base stations, only four ZP CSI-RS reference signals are needed at each of the four base stations. For a similar case indicated in R3-150723, fifteen ZP CSI-RS resources would be needed. In the above example, coordination means that in a given time-frequency partition only one TP is configured to transmit a non-zero-power signal, while the other TPs are configured to transmit a zero-power signal and in addition in another time-frequency resource all TPs are configured to use the CSI-RS as CSI-IM. Each time-frequency partition may comprise, for example, one or more REs, one or more PRBs, or a radio channel in at least one subframe.

Configurations Different from Those in Table 1

Other configurations of NZP transmissions can be also used in alternative embodiments, resulting in a system of linear equations which can be resolved.

The penalty is that more processing efforts will be needed by the coordinator.

Value Associated with the Edge Line

For obtaining the value associated with the edge line in the network graph, two measurements are typically needed:

Measurement of power received from NZP CSI-RS (one Interferer per Resource Element (RE) is preferred).

Measurement of background interference, including the receiver noise.

For example, the received interference power $P_{RI,2,1}$ by UE2 (served by eNB2) at its antenna port and during ZP CSI-IM1 from eNB1 is the received signal $P_{RS,1}$ from eNB1 during the NZP CSI-RS sent by eNB1, plus the power of the background interference $P_{RBI}$ (in W):

$$P_{RI,2,1} = P_{RS,1} + P_{RBI}$$

During CSI-RS5 the same UE measures only the background interference and its receiver noise:

$$P_{RBI} = P_{RI,2,5}$$

From the last two equations, it is evident that the power of the received NZP CSI-RS can be obtained from the total received power on this RE, minus the power of the signal representing the background interference including receiver noise:

$$P_{RI,2} = P_{RI,2,1} - P_{RBI} (W)$$

The coupling loss between the eNB1 and UE2 results (in dB) as the difference between the transmitted power of the NZP CSI-RS in dBm and the received power $P_{RS,1}$ of the same NZP CSI-RS in dBm.

The coupling loss between the eNB1 transmitter and UE2 receiver (served by eNB2) in dB is:

$$CL_{1,2,2} (dB) = 10*\log P_{T\text{-}CSI\text{-}RS} - 10*\log(P_{RI,2,1} - P_{RBI})$$

As a generalization, the Coupling Loss (CL) between the reference signal transmitter and the reference signal receiver is given by:

$$CL_{T,R} = 10*\log P_{T\text{-}RS} - 10*\log(P_{R\text{-}RS} - P_{RBI}),$$

where:
P indicate a transmit or receive power at the antenna connector,
T,R indicate transmitter and receiver, respectively, and RS indicates a reference signal in general,
RBI indicate the received background interference.

The linear CL is much easier to calculate, being given by:

$$CL = P_T/P_R = P_{T\text{-}CSI\text{-}RS}/(P_{R\text{-}RS} - P_{RBI}).$$

For implementing this equation, an UE should be configured with the value of the power transmitted by NZP CSI-RS of the considered serving or interfering eNB.

In another embodiment, UE can transmit the measured power to eNB or a Central Coordinator. The eNb or coordinator can then compute the CL, based on the knowledge of the transmitted power.

The pass-loss PL between eNB1 and UE2 can be obtained by subtracting the transmit and receive antenna gains from the coupling loss CL, in dB:

$$PL_{1,2,2} = CL_{1,2,2} - G_{T,1} - G_{R,2,2} - OL$$

While the computation of the path loss is possible, as shown above, it implies the knowledge of the antenna gain for each eNB and UE and the other losses for each edge link.

We consider that the coupling loss is a simpler and more abstract representation of an edge in the network graph and its use simplifies the computations of the expected MCS (modulation and coding scheme).

As a minimum, all the interferers can be cumulated in the NZP CSI-RS resource and the measurement can relate only to the received power in the NZP CSI-RS and ZP-CSI RS. The linear coupling loss is:

$$CL = P_T/P_{R\text{-}net},$$

where $P_{R\text{-}net}$ represents the net signal power, obtained after subtracting from the received power when transmitting NZP CSI-RS the received power when receiving ZP CSI-RS.

Multiple Transmit and Receive Antennas

In case that a transmission point includes multiple antennas, the CSI-RS can be transmitted in the modes defined in 3GPP TS 36.211 V12.6.0:
On antenna no.1
In multi-layer mode The actual transmission mode is typically selected through configuration.

The resulting coupling loss or path loss is not dependent on the relative power of the transmitted data versus CSI-RS transmitted power.

Messages

The messages supporting this approach belong to several categories, as shown below:
A. Inter-base station coordination—central coordinator
B. Inter-base station coordination—distributed approach
C. Configuration of CSI-RS transmissions and UE measurements over the air interface A. Inter-Base Station Coordination—Central Coordinator The role of the Central Coordinator is to select the parameters of the CSI Process for each eNB participating in the collaborating group, by defining for each TPi (Transmit Point i) the allocation of NZP and ZP CSI-RSs suitable to the configurations in Table 1:
a. CSI Process ID
b. CSI-RS-ConfigNZPId, for a bitmap indicating 1 for the selected NZP CSI-RS configurations (based on the rules in 36.211 or any other suitable standard)
c. CSI-IM-ConfigId, for a bitmap indicating 1 for the selected ZP CSI-RS configurations (based on the rules in 36.211 or any other suitable standard)
d. CSI-IM-NetworkConfigId (new) for a bitmap indicating the selected network-wide ZP CSI-RS or simply the configuration index of a ZP CSI-RS which will be reserved as network-wide ZP-CSI-RS.

The NZP CSI-RS should preferably use, for 4 CSI reference signals, the CSI-RS configurations 0 . . . 9 for FDD and TDD and the additional configurations 20 . . . 25 in the table 6.10.5.2-1 of 3GPP TS 36.211 V12.6.0 for the normal cyclic prefix and the corresponding configurations 0 . . . 7 and 16 . . . 21 in table 6.10.5.2-2 for the extended cyclic prefix, given that an UE should assume ZP transmission of the serving cell, if not configured otherwise by the serving eNB.

In addition, a Central Coordinator can establish the CSI-RS transmitted power for each TP; if the TP configures the CSI/RS transmission power, it may be a need, depending on what measurement is reported, to include it in a message to the Central Coordinator.

In order to transmit the above configurations to each eNB, the message should include also one or more of:

a. Cell ID (ECGI—E-UTRAN Cell Global Identifier)
b. Relevant subframe number for CSI-RS transmission
c. Time of transmission start—possibly expressed as System Frame Number (SFN)+offset
d. Time-frequency pattern (represented as bit map or equation) of the CSI-RS transmission, either as selected Physical Resource Blocks (PRBs) in each subframe or as selected groups of PRBs (for example subbands) in each subframe. Value "1" in the bit map will represent the PRB in which are configured NZP and ZP CSI-RS.

The Central Coordinator may establish the type of reports to get back from UE, with eventual additional processing by the eNB:
a. What is reported: received signal power at antenna port, coupling loss or pass loss, in dB or in a linear mode (mantissa and exponent), the power of the background interference including the noise of the amplification chain
b. Aperiodic or periodic report
c. For periodic reports: the time interval between reports
d. Cell ID (ECGI)
e. The UE ID, preferably the ID used by X2 interface
f. eNB ID, including the PLMN (operator identity).

If only the net received power at antenna port is reported, the Central Coordinator or the receiving eNB can compute the coupling loss if knows the power of the transmitted NZP CSI-RS.

The value of power of the transmitted NZP CSI-RS can be communicated by the O&M (Operation and Maintenance System) or by the sending eNB.

The measurement report can be provided per UE antenna port, if multiple transmit antennas are used, as specified in TS 36.211 and TS 36.213 Release 12.

The per-antenna port report can include the PMI recommended by UE for different modes of usage of antennas: multi-layer, beamforming, diversity combining, etc.

Another aspect of the report can be the measurement averaging over the system bandwidth, per component carrier (in case of carrier aggregation), per PRB, per groups of PRBs (as subband) for those PRBs in which the NZP-CSI RS was transmitted.

In addition, the measurement report can be done per subframe, if the CSI transmission is configured per subframe.

The algorithm used for NZP CSI-RS resource allocation and release is similar with that described for the distributed approach, with the difference that the process of resource allocation and release is executed only by the Central Coordinator.

Generally, in various embodiments the net signal power or the coupling loss is reported over an information channel to one or more of the eNBs, to one or more of the UEs, to the Central Coordinator, or to an Operation and Management (O&M) entity.

B. Inter-Base Station Coordination—Distributed Approach

In the distributed approach, a first eNB selects for a first cell the NZP CSI-RS and the ZP CSI-RS such to be both located in the same subframe.

The reason for using the same subframe is to keep the average background interference at the same level for both configured CSI-RSs; if the background interference is low, it is possible to use also different subframes for NZP CSI-RS and ZP CSI-RS.

The NZP CSI-RS should preferably use the CSI-RS configurations 0 . . . 9 for FDD and TDD and the additional configurations 20 . . . 25 in the table 6.10.5.2-1 of 3GPP TS 36.211 V12.6.0 for the normal cyclic prefix and the corresponding configurations 0 . . . 7 and 16 . . . 21 in table 6.10.5.2-2 for the extended cyclic prefix, given that an UE should assume ZP transmission of the serving cell, if not configured otherwise by the serving eNB.

For each mapping to physical resources there is a configuration index, for example Tables 6.10.5.2-1 of 3GPP TS 36.211 V12.6.0 for the normal cyclic prefix and table 6.10.5.2-2 for the extended cyclic prefix.

The information on configuration index for NZP and ZP CSI-RS, the information on time-frequency transmission patterns and eventually the information on NZP CSI-RS transmission power are sent in this invention through the X2 interface to all the collaborating eNBs.

A second eNB selects for a cell operating in the same frequency range a NZP CSI-RS which use the same subframe (preferably the second slot) and does not overlap with the already selected NZP CSI-RS. The selected ZP CSI-RS (CSI-IM) should overlap with the ZP CSI-RS used for background interference measurement. The transmission pattern should follow the existing transmission pattern as sent by the first eNB or, if this is missing, simply use the same subframe as the first base station.

This eNB sends also to all the other collaborating eNBs the related information on CSI-RS configuration, antenna gain, transmitted power, by using similar messages with those described for the Central Coordinator.

The process of configuration and communication can continue until the maximum number of CSI-RS configurations has been reached.

In case that an eNB wants to use for NZP transmission an already allocated CSI-RS configuration by another eNB also for NZP transmission, the eNB will allocate the NZP CSI-RS in the weakest interfering CSI-IM and will send a message to the eNB using the same NZP CSI-RS, announcing the re-use of the allocated resource for NZP. In addition, will send the same NZP CSI-RS also in the CSI-IM resource used for measuring the power of the background interference.

C. Configuration of CSI-RS Transmissions and UE Measurements Over the Air Interface The configuration of CSI-RS transmission and the UE reports could be transmitted over the PUSCH (physical uplink shared channel) as control information.

The relevant information from the list above is the configuration information:
a. CSI Process ID
b. CSI-RS-ConfigNZPId, for a bitmap indicating 1 for the selected NZP CSI-RS configurations (based on the rules in 36.211 or any other suitable standard)
c. CSI-IM-ConfigId, for a bitmap indicating 1 for the selected ZP CSI-RS configurations (based on the rules in 36.211 or any other suitable standard)
d. CSI-IM-NetworkConfigId (new) for a bitmap indicating the selected network-wide ZP CSI-RS or simply the configuration index of a ZP CSI-RS which will be reserved as network-wide ZP-CSI-RS.
e. What shall be reported: received signal power at antenna port, coupling loss or pass loss, in dB or in a linear form (mantissa and exponent), the power of the background interference including the noise of the amplification chain, only the noise of the amplification chain
f. Aperiodic or periodic report
g. For periodic reports: the time interval between reports The measurement result should be reported based on rules similar with those defined in 3GPP TS 36.213 Release 12.

Usage of the Network Graph

The network graph and the additional reported information can be used for determining (e.g., by the central coordinator):

Classification of interferers, with the scope to select the more relevant ones

Signal power, based on the coupling loss and the actual data transmission power

Interference power when receiving data, based on coupling loss to the different interferers and the actual data transmission power; in this case is needed the linear form of the coupling loss and the powers in wats Expected SINR for different desired data and interference data transmission powers Dynamic TP selection, such to obtain the highest SINR. It is desired to use the linear form of the coupling loss and powers, conducting to linear computations of SINR.

It should be noted that no CQI reporting is considered in the above examples.

Up-Link Network Graph

In the up-link CSI-RS reference signals are not defined. The only RS which could be used for deriving the coupling loss are the SRS (sounding reference signals).

However SRS, even if transmitted in every RE (Resource Element) in the last symbol of the subframe, allows, based on TS 36.211 V12.6.0 and TS 36.331 V12.6.0, only for two non-overlapping sets, each one using either even or respectively odd subcarriers in the assigned SRS bandwidth.

Based on our approach, one set could be used for NZP-SRS transmission and the other one for ZP-SRS transmission.

In order for an eNB to report the received power levels from different interfering UEs, in a similar way as discussed for downlink, it is needed to create more configurations, for example by creating a different SRS configuration approach, which will use, in a PRB, one SRS Resource Element per UE or two adjacent REs per UE.

Table 2 shows a possible allocation in uplink for four UEs, in accordance with an embodiment. In this example, each UE is served by a different eNB in the same subframe, from which only one UE is served by the reporting eNB. The index k indicates the subcarrier within the PRB. Two adjacent RE are allocated for a SRS configuration.

On UE side, the SRS can be transmitted with NZP or with ZP. For the UE RE where is used ZP, the eNB measures the interferences created by the other UEs and the receive radio amplifier(s) noise. For the REs where all the UEs transmit ZP, all the eNBs measure the background interference plus the own receive amplifier(s) noise.

TABLE 2

|  | SRS Config. 0 k = 0, 1 | SRS Config. 1 k = 2, 3 | SRS Config. 2 k = 4, 5 | SRS Config. 3 k = 6, 7 | SRS Config. 4 k = 8, 9 |
|---|---|---|---|---|---|
| UE1, served by eNB1 | NZP SRS | ZP SRS | ZP SRS | ZP SRS | ZP SRS |
| UE2, served by eNB2 | ZP SRS | NZP SRS | ZP SRS | ZP SRS | ZP SRS |
| UE3, served by eNB3 | ZP SRS | ZP SRS | NZP SRS | ZP SRS | ZP SRS |
| UE4, served by eNB4 | ZP SRS | ZP SRS | ZP SRS | NZP SRS | ZP SRS |

Based on this approach, it is possible to create a network graph in up-link, where the power of the background interference will be measured by the SRS Config.4.

The new allocation of SRS configuration shall be communicated by each serving eNB over the air; the information coordination will be done by a Central Coordinator or in distributed mode, similar with the process in downlink.

For each SRS configuration may be defined the precoding for each antenna port, in case that UE has 2, 4, or 8 antenna ports.

Sidelink Network Graph

Figure 4:
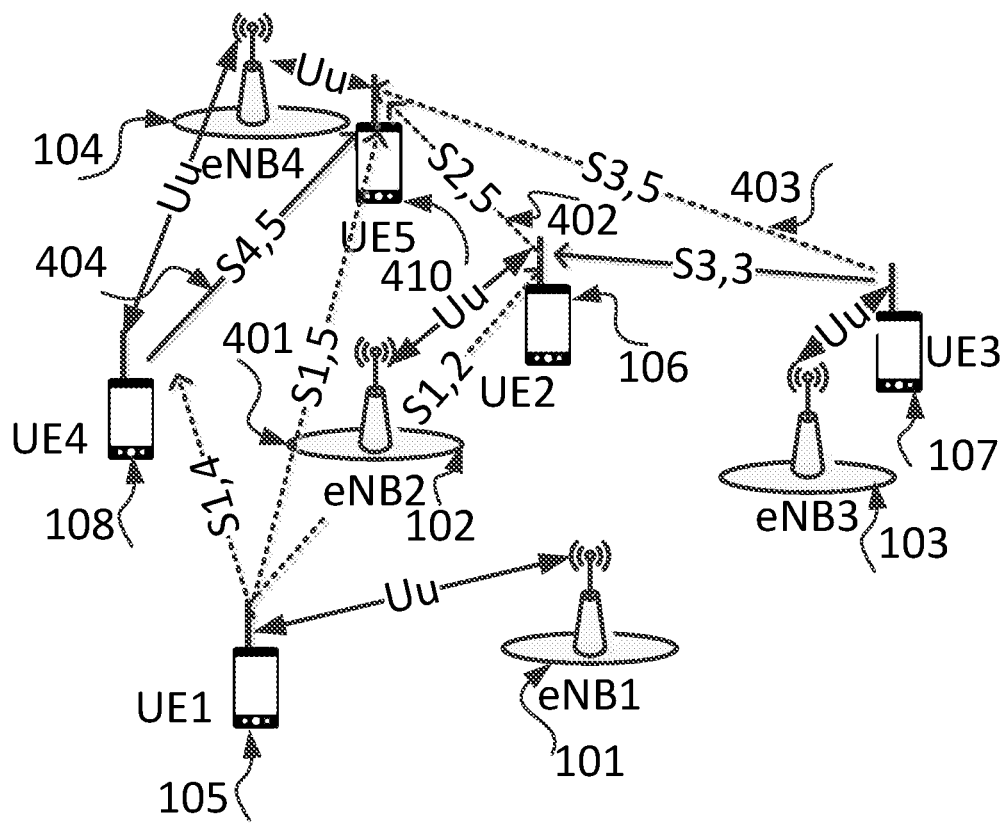
FIG. 4—Represents a Device-to-Device (D2D) network graph, in accordance with an embodiment of the present invention.

The communication between UEs in D2D mode is using the sidelink. A system and network graph view is shown in FIG. 4.

Considering D2D communication between UE4 and UE5, with UE5 as receiver, UE1, UE2 and UE3 create interference if they transmit in the same time and use the same PRBs. The relevant edges of the network graph for the above example are:

S1,5—401, between UE1—105 and UE5—410;
S2,5—402, between UE2—106 and UE5—410;
S3,5—403, between UE3—107 and UE5—410;
S4,5—404, between UE4—108 and UE5—410.

For creating the interference graph, it is useful to use the enhanced number of configurations for SRS, which in sidelink are named SSRS.

Table 3 shows a possible allocation of SSRS, in accordance with an embodiment of the present invention.

TABLE 3

|  | SSRS Config. 0 k = 0, 1 | SSRS Config. 1 k = 2, 3 | SSRS Config. 2 k = 4, 5 | SSRS Config. 3 k = 6, 7 | SSRS Config. 4 k = 8, 9 |
|---|---|---|---|---|---|
| UE5, eNB4 | NZP SRS | ZP SRS | ZP SRS | ZP SRS | ZP SRS |
| UE1, eNB1 | ZP SRS | NZP SRS | ZP SRS | ZP SRS | ZP SRS |
| UE2, eNB2 | ZP SRS | ZP SRS | NZP SRS | ZP SRS | ZP SRS |
| UE3, eNB3 | ZP SRS | ZP SRS | ZP SRS | NZP SRS | ZP SRS |

Assuming that all UEs are in the coverage area of a base station, the configuration of SSRS and the reported measurements will be conveyed from/to the serving eNB through the Uu interface. In turn, the serving eNB will communicate with a Central Coordinator or with other eNBs.

Another approach is that the measurement results will be conveyed to the communicating UEs, which are using the side link. Each UE will configure the SSRS configuration as shown for eNBs in distributed mode, i.e. based on the previous allocations of other UEs.

Coupling Loss Determination Using Data Instead of Reference Signals

In some cases the use of coordinated RS transmission is not feasible, for example when there is no synchronization between entities forming the network graph or when different entities use different RATs (radio access technologies).

In such a case it is possible to use the data transmitted during specific frequency intervals with NZP or ZP, as explained above.

This approach works better with a Central Coordinator, in charge of time-frequency resource scheduling.

The reports of network entities are similar to those discussed above.

Interference Created by a Node Transmitting in an Adjacent Channel

It is difficult to determine the interference per RE, however it is possible to determine the interference effect when a full subcarrier or PRB or a group of PRBs (for example subband) or a full carrier is transmitted.

In this case the most straightforward approach is to use most REs in the selected part of the channel, i.e. to transmit data in a slot or a symbol and transmit nothing in the same channel part but in another slot or symbol, preferably belonging to the same subframe.

In uplink, the absence or presence of the DMRS (demodulation RS), SDMRS (sidelink DMRS), SRS, SSRS can also perform this task.

The measurement results with and without transmitted power should be scaled relatively to the number of REs used for transmission and for measurement.

A special configuration of the transmissions will be necessary such to limit the number of transmitters in the same time interval.

UE Block Diagram

Figure 5:
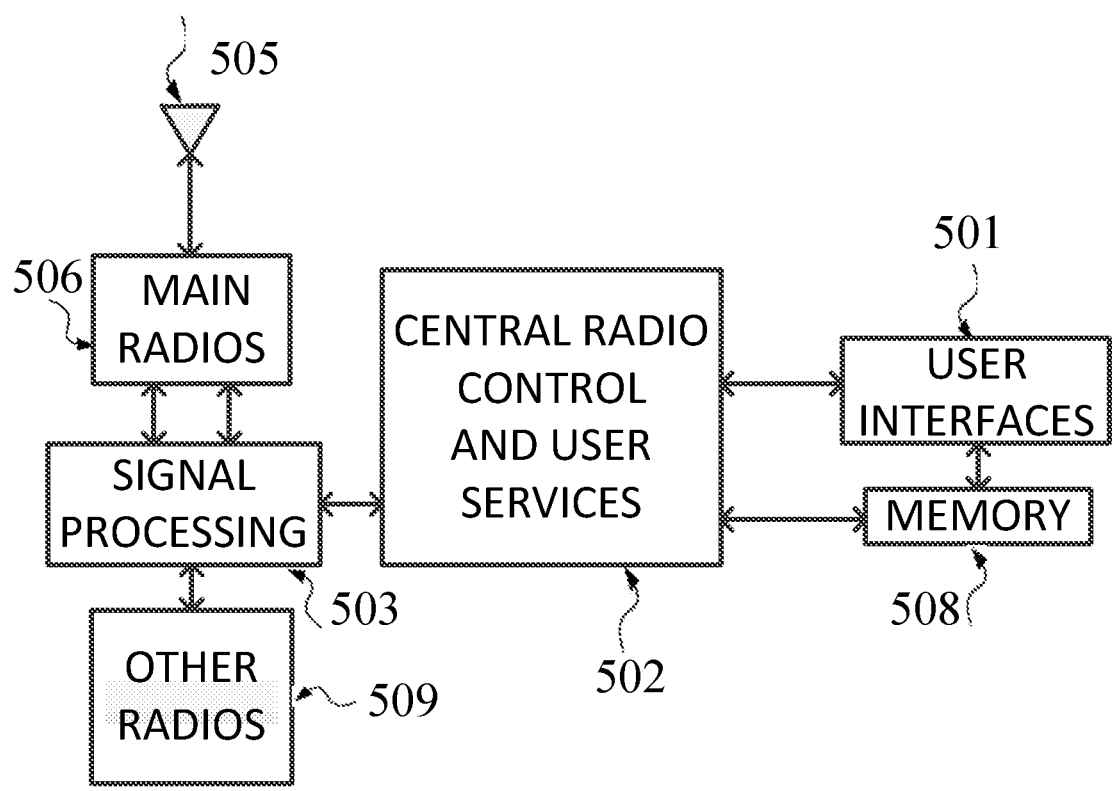
FIG. 5—Represents a UE block diagram, in accordance with an embodiment of the present invention.

FIG. 5 shows the UE block diagram, in accordance with an embodiment of the present invention. The central radio control and user services 502, including the functions related to the User Plane and Control Plane as described in 3GPP TS 36.300 may also perform other high-layer user services, including running applications.

The user interfaces, such as the display, speaker, and microphone, are located in a user interface block 501.

A memory block 508, containing RAM and non-volatile memory (FLASH or ROM) is used by the central processing unit 502 and depending on the actual UE implementation, may be used also by the user interfaces 501.

Digital signal processing is performed by a signal processing block 503 connected to the radio block 506, for the cellular operation in licensed and un-licensed bands, and also to other radios—509, such as WiFi and Bluetooth, operating generally in license-exempt bands. A common antenna 505 can be used for receive (RX) and transmit (TX), while using diplexers or switches to connect it. If the receive and transmit radio frequencies are far from each other, however, different antennas may be used.

In the present context, all the UE elements other than the antenna(s) are referred to collectively as circuitry that carries out the disclosed techniques.

Base Station Implementation

Figure 6:
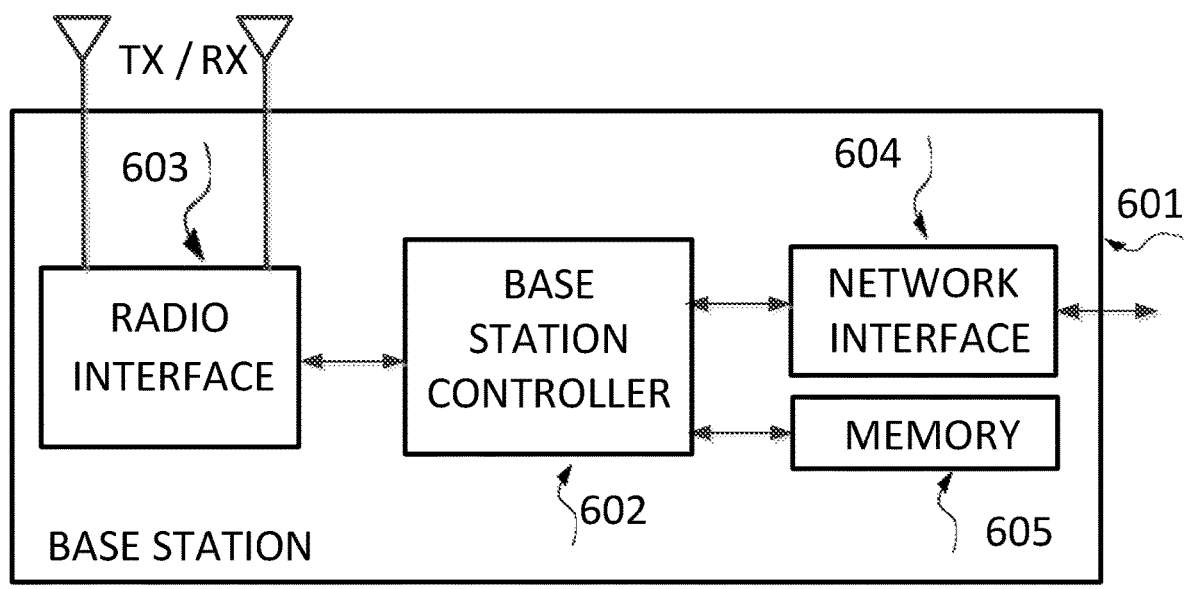
FIG. 6—Represents a base station block diagram, in accordance with an embodiment of the present invention.

FIG. 6 shows a BS block diagram, in accordance with an embodiment of the present invention. The base station blocks shown in FIG. 6 are only by way of examples; in practical implementations these blocks can be distributed on multiple circuit boards, and the control functions and user plane functions can be implemented on commercial processors or tailor-made logical arrays, such as system-on-a-chip, FPGAs, ASICs.

The functional blocks of the base station—601 identified as relevant to this invention are one or more antennas, the radio interface 603, providing wireless communication with a UE, the network (communication) interface 604 enabling message transmission over the network, towards another base station or to the Operation and Management (OAM) or to a Central Coordinator.

The controller 602 includes as a subset of its functions, some functions relevant to this invention, such as scheduling of the reference signals, configuring and obtaining reports from an UE, including computing functions determining coupling loss or the path loss. The data used by the controller is stored in a memory block—605.

In the present context, all the base station elements other than the antenna(s) are referred to collectively as circuitry that carries out the disclosed techniques.

Central Coordinator

The Central Coordinator typically comprises one or more processors that run one or more software modules, adapted for configuring transmitting nodes and obtaining measurement results for receiving nodes, calculating the network graph or the link budget based on the received measurements and controlling the radio resource scheduling while considering the computation results.

The Central Coordinator includes hardware computing resources such as one or more processors, memory, communication interfaces such as a network interface for communicating with the eNBs.

The Central Coordinator may use dedicated enclosures or can run its software on virtual machines or by other means for sharing resources with other software modules.

Technologies

As will be appreciated by those skilled in the art, the terminology used throughout the specification is mainly associated with the LTE standards. However, it should be understood that embodiments of the present invention encompass other cellular standards, such as HSDPA and the like and both TDD and FDD duplexing modes.

The examples provided show certain ways of carrying out the invention. It is to be understood that invention is not intended to be limited to the examples disclosed herein. Rather, the invention extends to all functionally equivalent structures, methods and uses, as are within the scope of the claims.

The invention claimed is:

1. A method for wireless network operation, comprising:
forming a cluster of transmitters and receivers in a wireless network, wherein at least one further transmitter in the wireless network is not included in the cluster, and wherein a first receiver in the cluster, belonging to a second node, receives desired signals from a first transmitter in the cluster, belonging to a first node, and interfering signals from at least one second transmitter in the cluster, belonging to at least one third node;
configuring the first transmitter to transmit in its own first time-frequency partition a first signal at a non-zero transmission power;
configuring each specific second transmitter to transmit in its own specific third time-frequency partition a specific third signal at a non-zero transmission power;
configuring each transmitter in the cluster to transmit a zero power signal during each time-frequency partition dedicated for transmitting the non-zero transmission power signal by each other transmitter in the cluster;
configuring all transmitters in the cluster to transmit the zero power signal during a second time-frequency partition, not overlapping with any of the first and third time-frequency partitions;
configuring the first receiver in the cluster, belonging to the second node to determine a specific first received power in the specific third time-frequency partition and to determine a second received power in the second time-frequency partition, wherein the second received power represents the sum of interference, created by the at least one further transmitter not included in the cluster, and of the noise of the first receiver of the second node;
calculating a net received power of the specific third signal by subtracting the second received power from the specific first received power; and
computing a specific first coupling loss between the specific second transmitter of the at least one third node and the first receiver of the second node, based on the net received power of the specific third signal and on the non-zero transmission power of the specific third signal.

2. The method according to claim 1, wherein each of the first node, second node and third node is a base station, a radio head deployed in distributed or centralized architecture, a relay or a User Equipment (UE), selected from a group consisting of cellular user equipment, WiFi user equipment, and Bluetooth user equipment.

3. The method according to claim 1, wherein each of the first, second and specific third time-frequency partitions comprises a resource element, multiple resource elements, a physical resource block, a group of physical resource blocks, or a radio channel within at least one subframe.

4. The method according to claim 1, and comprising averaging the specific first received power or the second received power or the net received power over at least one element in a list consisting of: a system bandwidth of the wireless network, a component carrier, one or more of physical resource blocks, and one or more subframes.

5. The method according to claim 1, wherein the first receiver in the cluster is additionally configured to determine a third received power in the first time-frequency partition and to compute a net received power of the first signal by subtracting the second received power from the third received power for computing a second coupling loss between the first transmitter belonging to the first node and the first receiver belonging to the second node, based on the net received power of the first signal and on the non-zero transmission power of the first signal.

6. The method according to claim 5, wherein computing the coupling loss comprises representing the specific first coupling loss or the first second coupling loss in logarithmic form or in linear form.

7. The method according to claim 5, wherein computing the net received power of the specific third signal or the net received power of the first signal or computing the specific first coupling loss or computing the second coupling loss is executed by a node or by a Central Coordinator.

8. The method according to claim 1, wherein the first and/or the specific third signals are reference signals and transmitting the first signal and/or the specific third signal comprises transmitting configurations of reference signals over an air interface from a base station to a user equipment, or from a user equipment to another user equipment.

9. The method according to claim 1, wherein transmitting the non-zero transmission power signals and zero power signals comprises establishing the configurations of the signals and/or the configurations of the time-frequency partitions and/or of transmission mode in each transmitter and/or receiver by a central coordinator or by a node and transmitting these configurations through a message to each node comprising the respective transmitter or receiver.

10. The method according to claim 5, and comprising reporting the net received power of the first signal or of the specific third signal and/or the specific first coupling loss or the second coupling loss over an information channel to a base station, to a user equipment, to a Central Coordinator, or to an Operation and Management entity.

11. The method according to claim 7, and comprising calculating by a Central Coordinator or by a node, based on the specific first coupling loss and/or based on the second coupling loss, an expected received power of a signal carrying user data and/or of at least one interfering signal, when the signal carrying user data or the at least one interfering signal is transmitted with a power value different from the non-zero power value used to compute the specific first coupling loss.

12. The method according to claim 11, and comprises computing by the Central Coordinator or by a node an expected Modulation and Coding Scheme (MCS) to be used by the node or to be used by another node or to be used for selecting a node, considering an expected SINR computed based on the expected received power of a signal carrying user data and on the expected received power of at least one interfering signal.

13. The method according to claim 1, wherein the first transmitter of belonging to the first node and/or the at least one second transmitter belonging to the third node use mutually-adjacent frequency channels.

14. The method according to claim 1, wherein the first receiver in the cluster is additionally configured to determine a third received power in the first time-frequency partition for computing a second simplified coupling loss between the first transmitter belonging to the first node and the first receiver belonging to the second node, based on the received power in the first time-frequency partition and on the non-zero transmission power of the first signal.

15. A method according to claim 5, wherein the second coupling loss value or the specific first coupling loss value is assigned as value of an edge link in a network graph, wherein the edge link connects respectively the first transmitter of the first node or the specific transmitter of the third node with the first receiver of the second node.

16. A method according to claim 14, wherein the second simplified coupling loss value or the specific first coupling loss value is assigned as value of an edge link in a network graph, wherein the edge link connects respectively the first transmitter of the first node or the specific transmitter of the third node with the first receiver of the second node.

17. A third node in a wireless network, having transmitters in a cluster of transmitters and receivers, wherein at least one further transmitter in the wireless network is not included in the cluster, and wherein a first receiver of a second node receives from a transmitter of a first node desired signals and receives at least from the third node interfering signals, the third node comprising:
one or more antennas; and
at least one transmitter, wherein a specific transmitter is configured by a processor to transmit in a transmitter specific third time-frequency partition a specific third signal at a non-zero transmission power, while all the transmitters of other nodes in the cluster are configured to transmit a non-zero power specific signal in their own specific time-frequency partition, and also to transmit a zero power signal during each time-frequency partition dedicated to each other transmitter in the cluster for the transmission of the non-zero power signal, and to transmit a signal at a zero transmission power in a second time-frequency partition, not overlapping with any other transmitter specific time-frequency partition in the cluster, while all transmitters of other nodes in the cluster are configured to transmit a zero power signal during the second time-frequency partition, so as to enable the first receiver of a second node to determine a specific received power of the specific signal transmitted by the specific transmitter of the third node, and to determine a second received power in the second time-frequency partition, wherein the second received power represents the sum of interference, created by the at least one further transmitter not included in the cluster, and of the noise of the first receiver, for calculating a net specific first received power of the specific third signal by subtracting the second received power from the specific first received power and either computing a specific first coupling loss between the specific second transmitter of the third node and the first receiver of the second node based on the net received power of the specific third signal and of the non-zero transmission power of the specific third signal or transmitting the value of the net received power to another node or to a central coordinator for computing a coupling loss.

18. The first node according to claim 17, wherein the first or the second transmitter comprises a cellular, WiFi or Bluetooth radio.

19. A second node in a wireless network, having receivers in a cluster of transmitters and receivers, wherein at least one further transmitter in the wireless network is not included in the cluster, and wherein a second node receives from a first node desired signals and from a third node interfering signals, the second node comprising:
   one or more antennas; and
   at least one receiver, wherein a first receiver is configured by a processor to receive in a first time-frequency partition a first signal transmitted by a first transmitter of a first node at a non-zero transmission power, and to receive from each specific second transmitter of a third node a specific third signal at a non-zero transmission power within its own specific third time-frequency partition, wherein each transmitter in the cluster is configured to transmit a zero power signal during each time-frequency partition dedicated for transmitting the non-zero power signal by each other transmitter in the cluster, and wherein all transmitters in the cluster are configured to transmit a zero power signal in a second time-frequency partition, not overlapping with any of the first and third time-frequency partitions, and wherein the first receiver of the second node is additionally configured to determine a specific first received power in the specific third time-frequency partition and to determine a second received power in the second time-frequency partition, wherein the second received power represents the sum of interference, created by the at least one further transmitter not included in the cluster, and of the noise of the first receiver of the second node, for calculating a net received power of the specific third signal by subtracting the second received power from the specific third signal received power and computing a specific third coupling loss between the specific second transmitter of the third node and the first receiver of the second node, based on the net received power of the specific third signal and of the non-zero transmission power of the specific third signal.

20. The second node according to claim 19, wherein the receiver comprises a cellular, WiFi or Bluetooth radio.

21. An apparatus for controlling or coordinating or managing a wireless network, the apparatus comprising:
   a communication interface for communicating with at least three nodes having transmitters and receivers included in a cluster in the wireless network, wherein at least one further transmitter in the wireless network is not included in the cluster, and wherein a first node transmits to a second node desired signals, and a third node transmits to the second node interfering signals; and
   a processor, configured to configure a first transmitter of a first node to transmit in a first time-frequency partition at least one first signal at a non-zero transmission power, and to configure each at least one second transmitter of the third node to transmit a non-zero power specific signal within its own specific time-frequency partition, and to configure each transmitter in the cluster to transmit a zero power signal during each time-frequency partition dedicated for transmitting the non-zero power signal by each at least one other transmitter in the cluster, and to configure all transmitters in the cluster to transmit a zero power signal in a second time-frequency partition, not overlapping with any of the first or third time-frequency partitions, wherein the first receiver of the second node is configured to determine a specific first received power in the specific third time-frequency partition and to determine a second received power in the second time-frequency partition, wherein the second received power represents the sum of interference, created by the at least one further transmitter not included in the cluster, and of the noise of the first receiver of the second node, and the processor is additionally configured to calculate or receive a calculation of a net received power of the specific third signal by subtracting the second received power from the specific first received power, and to compute or receive a computation of a specific first coupling loss between the specific second transmitter of the at least one third node and the first receiver of the second node, based on the net specific first received power and on the non-zero transmission power of the specific third signal.

22. A wireless communication system, comprising:
   a cluster of transmitters and receivers in a wireless network, wherein at least one further transmitter in the wireless network is not included in the cluster, and wherein a first receiver in the cluster, belonging to a second node, receives from a first transmitter in the cluster, belonging to a first node, desired signals and from the at least one second transmitter in the cluster, belonging to a third node, interfering signals; and
   one or more processors, configured to:
      configure a first transmitter of the first node to transmit in a first time-frequency partition a first signal at a non-zero transmission power, and configure each specific second transmitter in the cluster to transmit in its own specific third time-frequency partition a specific third signal at a non-zero transmission power;
      configure each transmitter in the cluster to transmit a zero power signal during each time-frequency partition dedicated for transmitting the non-zero transmission power signal by each other transmitter in the cluster;
      configure all transmitters in the cluster to transmit the zero power signal during a second time-frequency partition, not overlapping with any of the first and third time-frequency partitions;
      configure the first receiver of the second node to determine a specific first received power in the third time-frequency partition and to determine a second received power in the second time-frequency partition, wherein the second received power represents the sum of interference, created by at least one further transmitter not included in the cluster, and of noise of the first receiver of the second node;
      calculate a net received power of the specific third signal by subtracting the second received power from the specific first received power; and
      compute or receive a computation of a specific first coupling loss between the specific second transmitter of the at least one third node and the first receiver of the second node, based on the net received power of the specific third signal and based on the non-zero transmission power of the specific third signal.

* * * * *